Patented July 18, 1939

2,166,121

UNITED STATES PATENT OFFICE 2,166,121

DUSTING COMPOSITION

Alfred M. Boyce, Riverside, Calif., dedicated by assignment to the Government and the People of the United States of America No Drawing. Application December 9, 1937, Serial No. 178,878

7 Claims. (Cl. 167—31)

This invention relates to new dust compositions for use in the control of insect and mite pests on trees and plants.

Dinitro-phenol compounds and their salts are toxic to a number of common insects. Low concentrations of these compounds may be applied to certain trees and plants under carefully controlled conditions for pest control, but by reason of the mechanical difficulties encountered in their application, their toxicity to humans, and their tendency to injure living vegetation when applied thereto at too high concentrations, they have not been widely used for insecticidal purposes. To overcome the above disadvantages, solutions of 2,4-dinitro-phenol compounds in petroleum oil have been employed, which compositions exert a synergistic insecticidal effect upon a number of insect and mite species. While this type of composition has proved advantageous in certain phases of pest control on deciduous plants, little benefit has been derived therefrom in the control of pests on citrus and other tropical and subtropical species. The use of oily insecticidal compositions on the latter provides commercial control for certain common pests, but repeated applications over an extended period have been found to seriously interfere with the development and life cycle of the plant, depressing the plant metabolism, and causing other undesirable physiological disturbances.

I have discovered that when a relatively small amount of a dinitro-phenol compound is intimately incorporated with or adsorbed on a carrier consisting essentially of finely divided walnut shells, a composition is obtained which can be employed advantageously as an insecticidal dust for application to the foliage of both citrus and deciduous plant species whereby an even distribution of the phenolic compound upon the tree surfaces without injury thereto, and a superior control of insect and mite pests is accomplished. This composition is conveniently handled in common dusting apparatus, and does not leave an objectionable residue on the tree or plant following application. When applied to foliage, bark, and fruit, this composition has superior sticking characteristics and properties of residual toxicity which are not possessed by finely divided dusts of the nitro-phenol compound alone or by solutions thereof.

The walnut shell carrier consists of fine yellow-brown flakes, is soluble in distilled water to the extent of from 1 to 2 per cent by weight, and tends to acidify and buffer water to a pH between 4.5 and 5.5. It is substantially non-reactive with phenolic derivatives under the conditions of operation, has no independent insecticidal toxicity, and is innocuous to both plants and humans. For use as an insecticide carrier it is preferable that the shell product, hereinafter termed "walnut shell flour", shall have a particle size not in excess of 100 screen mesh, material of from 300 to 400 mesh having been found particularly satisfactory.

The dinitro-phenolic compounds with which this invention is particularly concerned are those having the following formula:

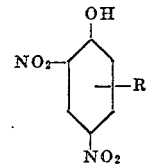

wherein R represents an alkyl or cycloalkyl radical containing at least 3 carbon atoms. While certain of the nitro compounds heretofore suggested as insecticides have been found to have a high toxicity to animals and humans and to be corrosive to living tissue, the compounds of the above class are relatively innocuous in the amounts employed.

According to the invention, a small proportion of a dinitro-phenolic compound is intimately mixed or otherwise incorporated with the walnut shell flour in any suitable manner to secure a thorough dispersion of the nitro compound through the carrier. For example, the phenol may be ground with the walnut shell flour to produce a product of suitable particle size. A further means for incorporating the phenolic derivative into the walnut shell flour consists in dissolving the phenol in a volatile organic solvent, moistening and mixing the carrier with the resultant solution, and subsequently evaporating the solvent from the mixture. The product obtained as above may be further ground if desired but is generally adapted for use in insecticidal dusting without further treatment.

The proportion of dinitro-phenolic compound preferably incorporated in walnut shell flour is generally between about 0.25 and 2.0 per cent by weight thereof, depending upon the particular insect or mite pest for which the composition is to be applied, the tolerance of plant species for the dinitro compound, and the amount of the composition to be applied to the individual tree. For application to citrus trees, concentrations of from approximately 0.5 to 1.5 per cent by weight of dinitro-phenol compound in the composition have been found to give satisfactory insect control and to be substantially non-injurious. The amount of the dusting composition applied to each insect or mite infested tree or plant is dependent upon the pest species involved and the concentration of the phenol in the composition. The compositions may be further modified by the inclusion therein of various wetting, spreading, acidifying, or buffering agents or dyes. The addition of alkaline agents is not recommended since a particularly advantageous characteristic of the composition lies in the ability of the walnut shell flour to acidify and buffer to an acid pH whereby the water solubility of the nitro-compound is greatly reduced and the toxicity of the applied dust extended over a much longer period than are dinitro-phenol containing dust materials of alkaline reaction.

The following examples set forth certain modes in which my invention may be employed and certain aspects thereof but are not to be construed as limiting the invention.

*Example 1*

Two pounds of 2,4-dinitro-6-cyclohexyl-phenol crystals and 2 pounds of walnut shell flour were ground together in a ball mill until the particle size of the dust mixture was between 300 and 400 screen mesh. This dust composition was then mixed with an additional 196 pounds of walnut shell flour and dusted on Valencia orange trees at 1.5 to 2.0 pounds of composition per tree. These trees were badly infested with citrus red mite. The dust adhered well to the bark, leaves, and fruit and gave an even coverage of the tree surfaces, leaving no unsightly local concentrations of material. The dusted trees were periodically inspected over a period of several weeks and found to be substantially free of citrus red mite infestation. It was found that all of the mites and an appreciable percentage of the eggs present on the trees at the time of dusting were killed. The mites which hatched over a considerable period following dusting were also controlled. No leaf or fruit injury resulted from the dusting operation. Undusted control trees continued to be badly infested with mites and eventually suffered leaf and fruit injury therefrom.

*Example 2*

Lisbon and Eureka lemon trees were dusted with a mixture of walnut shell flour and dinitro-o-cyclohexyl-phenol substantially as described in Example 1. The dusted trees were found to be free of mite infestation and injury and showed no injury attributable to the dust application. Undusted controls showed both fruit and leaf injury attributable to the mite. This injury consisted in the silvering of leaves and fruit due to the mites extracting plant juices therefrom for food. The injury in some cases was so severe as to cause partial defoliation and reduction in the vigor of the tree.

*Example 3*

To determine the tolerance of Navel orange and Lisbon lemon trees for the composition described in the foregoing example, a group of trees were repeatedly dusted therewith at approximately ten-day intervals until a total of approximately 12 pounds of the dust per tree had been applied. Although the trees were exposed to heavy dews and excessive summer temperatures during this series of tests, no unfavorable tree reaction or fruit injury was observed. A satisfactory control of red mite and related pests was obtained. In similar experiments 1 per cent mixtures of 2,4-dinitro-6-cyclohexyl-phenol in walnut shell flour were dusted on walnut, apricot, fig, avocado, apple, and peach foliage and fruit. Injury resulting from these applications was negligible.

*Example 4*

Dust mixtures were prepared by dissolving 2,4-dinitro-6-cyclohexyl-phenol in toluene, moistening and mixing walnut shell flour of 300 to 400 screen mesh particle size with the solution, and thereafter evaporating off the toluene, the dinitro-cyclohexyl-phenol being apparently adsorbed by the carrier. There was no tendency for the composition so prepared to form agglomerates. These dust mixtures were tested to determine their toxicity against greenhouse thrips.

The procedure followed consisted in dusting mature Navel oranges with the test composition, thereafter infesting the dusted fruit with adult thrips, storing the infested fruit at a temperature of 80° F. and a relative humidity of 60 per cent for a period of from 1 to 5 days, and thereafter counting the dead and living thrips on each test fruit. In each instance the fruit was from 2.5 to 3 inches in diameter and was dusted with from 0.75 to 1.0 gram of the test composition. From 75 to 100 thrips were employed in each infestation.

Dusts prepared as described above and containing from 0.5 to 1.0 per cent by weight of the dinitro-phenolic compound therein, killed 100 per cent of the test insects. From 90 to 95 per cent of test insects were found to survive on untreated oranges. When walnut shell flour alone was employed as a dust and the fruit subsequently inoculated with test insects, the mortality was only from about 8 to 12 per cent. No injury to the fruit resulted from the dust treatment.

*Example 5*

In a similar manner freshly picked grapefruit of 4 inches diameter were washed and dried. Each fruit was then precision dusted with 1 gram of a mixture of walnut shell flour and 2,4-dinitro-6-cyclohexyl-phenol. The dusted fruits were weathered by exposure to sunlight, wind, and dew for several days and tested from time to time against adult female citrus red mites to determine the residual toxicity of the dust deposit. A composition containing 0.5 per cent by weight of the dinitro compound gave an initial kill of 100 per cent of the mites and after 12 days weathering was still toxic to an average of 73.8 per cent thereof. A dust containing 1.0 per cent by weight of the phenol gave a 98 per cent mortality after 12 days. Walnut shell flour alone gave a control of only 12.5 per cent of the test mites.

While the above examples concern compositions containing 2,4-dinitro-6-cyclohexyl-phenol, other compounds such as 2,4-dinitro-6-isopropyl-phenol, 2,4-dinitro-6-normal-butyl-phenol, 2,4-dinitro-6-tertiary-butyl-phenol, 2,4-dinitro-5-secondary-amyl-phenol, 2,4-dinitro-6-cyclopentyl-phenol, 2,4-dinitro-5-cyclohexyl-phenol, 2,4-dinitro-6-normal-hexyl-phenol, 2,4-dinitro-6-normal-octyl-phenol, etc., may be substituted therefor. Mixtures of the above and similar compounds with walnut shell flour may be applied as dusts for the control of such pests as red spider, Pacific mite, yellow mite, yellow striped army worm, citrus thrips, bean thrips, flower thrips, black scale, citricola scale, orange tortrix, six-spotted mite, etc.

This application is a continuation-in-part of my prior and co-pending application Serial Number 177,737, filed December 2, 1937.

Other modes of applying the principle of my invention may be employed instead of those explained, change being made as regards the materials or amounts thereof employed, provided the products claimed in the following claims be thereby obtained.

I therefore particularly point out and distinctly claim as my invention:

1. An insecticidal composition adapted to be dusted on growing plants, consisting of an impalpable powder comprising walnut shell flour of smaller particle size than 100 screen mesh, and carrying as an insecticidal toxicant intimately incorporated therewith a compound having the formula

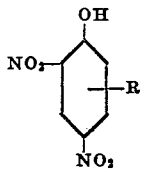

wherein R represents a hydrocarbon group containing at least 3 carbon atoms selected from the class consisting of the alkyl and cycloalkyl radicals.

2. An insecticidal dust comprising as a major constituent walnut shell flour of smaller particle size than 100 screen mesh and a relatively small amount of an insecticidal toxicant intimately incorporated therewith, such toxicant being a compound having the formula

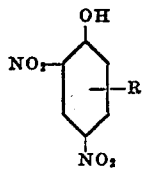

wherein R represents a hydrocarbon group containing at least 3 carbon atoms selected from the class consisting of the alkyl and cycloalkyl radicals.

3. An impalpable powder adapted to be dusted on growing plants for the control of insect and mite pests, said powder having a particle size smaller than 100 screen mesh, and comprising as a major constituent walnut shell flour having intimately incorporated therewith a compound of the formula

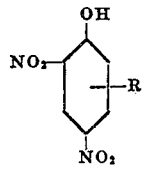

wherein R represents a hydrocarbon group containing at least 3 carbon atoms selected from the class consisting of the alkyl and cycloalkyl radicals.

4. An insecticidal dust comprising as a major constituent walnut shell flour of smaller particle size than 100 screen mesh, and a relatively small amount of an insecticidal toxicant intimately incorporated therewith, such toxicant being a compound having the formula

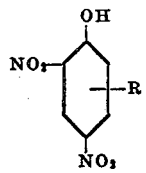

wherein R represents an alkyl group containing at least 3 carbon atoms.

5. An insecticidal dust comprising as a major constituent walnut shell flour of smaller particle size than 100 screen mesh and a relatively small amount of an insecticidal toxicant intimately incorporated therewith, such toxicant being a compound having the formula

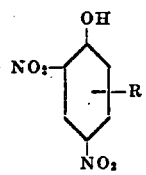

wherein R represents a cycloalkyl group.

6. An insecticidal dust comprising as a major constituent walnut shell flour of smaller particle size than 100 screen mesh and a relatively small amount of 2,4-dinitro-6-cyclohexyl phenol intimately incorporated therewith.

7. An impalpable powder adapted to be dusted on growing plants for the control of insect and mite pests, said powder having a particle size smaller than 100 screen mesh, and comprising as a major constituent walnut shell flour, and intimately incorporated therewith 2,4-dinitro-6-cyclohexyl phenol.

ALFRED M. BOYCE.